May 12, 1959 R. C. MOORE 2,886,632
CARRIER-WAVE MODULATING SYSTEM
Filed June 28, 1952 3 Sheets-Sheet 1

INVENTOR.
ROBERT C. MOORE
BY
Allen V. Hagstrom
ATTORNEY

INVENTOR.
ROBERT C. MOORE
BY Allen V. Hazeltine
ATTORNEY

INVENTOR.
ROBERT C. MOORE
BY
Allen V. Hazeltine
ATTORNEY

United States Patent Office 2,886,632

Patented May 12, 1959

2,886,632

CARRIER-WAVE MODULATING SYSTEM

Robert C. Moore, Erdenheim, Pa., assignor to Philco Corporation, Philadelphia, Pa., a corporation of Pennsylvania Application June 28, 1952, Serial No. 296,160

5 Claims. (Cl. 178—5.4)

The invention relates to means for generating phase-reference signals, and more particularly to color television systems for alternately transmitting phase-reference signals and phase-modulated signals representative of color-specifying parameters.

In intelligence-transmission systems in which information is conveyed by the phases of transmitted signals, it is generally important to transmit also intelligence indicative of the phase reference with respect to which the phase-modulation has been accomplished. This permits comparison at a receiver of the phase-modulated signal with an accurate phase-reference signal, and therefore makes possible faithful demodulation of the intelligence conveyed by the phase modulation.

An important application of such general arrangements occurs in certain color television systems in which a first and a second signal representative of two color-specifying parameters are transmitted by means of a pair of differently-phased subcarrier signal components, each amplitude-modulated in accordance with a different one of these first and second signals, while a third signal representative of a third color-specifying parameter is transmitted in a low-frequency band by conventional methods, as exemplified by standard monochrome transmission. The amplitude-modulated subcarrier components, when combined, produce a resultant signal for transmission which is phase-and-amplitude modulated. To rederive each of the original first and second signals at the receiver, the receiver resultant signal is usually mixed with a refence signal having a phase substantially identical with that component of the subcarrier which possesses the amplitude-modulation to be detected.

To provide proper phase-reference signals at the receiver, bursts of oscillations of the desired reference phase may be transmitted during intervals in which the image-representing signals are absent, preferably during the "backporch" intervals of the horizontal blanking pulses following the horizontal synchronizing pulses. This has been accomplished in the past by generating separately the amplitude-modulated subcarrier signals and the bursts of phase-reference oscillations and combining them in appropriate time-relationship subsequent to their separate generation.

While these arrangements of the prior art may be satisfactory in certain instances, the extreme importance of maintaining exact phase accuracy of the reference signal at the transmitter makes it highly desirable to provide further improvements in the reliability, precision, and ease of adjustment of such arrangements.

Accordingly, it is an object of my invention to provide an improved system for transmitting a phase-modulated signal and a phase-reference signal therefor.

Another object is to provide an improved color-television transmitter for producing subcarrier signal components representative of color-specifying parameters of an image during first time-spaced intervals, and for producing, during other time-spaced intervals, phase-reference signals which are accurately and reliably indicative of the phase of at least one of said subcarrier components.

A further object is to provide a color television system for producing a pair of subcarrier components, each amplitude-modulated in accordance with variations of a different color-specifying parameter during horizontal line-scannings of an image, and for providing bursts of oscillations during intervals between successive line-scanning intervals which are accurately and reliably indicative of the phase of at least one of said subcarrier components.

In accordance with the invention, the above objects are attained by controlling the modulators which produce signals contributing to the resultant phase-modulated signal in such manner that each is returned to a predetermined reference condition during intervals reserved for the generation of phase-reference signals. Preferably, each modulator is such as to produce substantially zero output signal during intervals in which no modulating signals are applied thereto, and pedestal-pulse signals of predetermined form and polarity are applied to one of the modulators during such intervals. For the durations of these pedestal pulses, the resultant signal comprises bursts of oscillations having a phase identical with the phase of that signal component which is produced by a selected one of the modulators in response to modulating signals of predetermined polarity applied thereto. Since the phase-reference bursts are produced by exactly the same mechanism as are the intelligence-modulated subcarrier components from the same modulator, the phases of the reference oscillations and of the corresponding subcarrier component are affected in exactly the same ways by any variations in the subcarrier modulation and transmission system. Reliability and accuracy of the phase-reference signal are therefore assured, and the need for critical phase adjustments eliminated.

More particularly, the invention may be applied to a color television system transmitting a first and a second color-specifying parameter by means of differently-phased, amplitude-modulated subcarrier components of the same subcarrier frequency. Preferably, amplitude-modulation of each subcarrier component is effected by means of a balanced modulator which produces a pair of oppositely-phased carrier signals which are of equal amplitude when the modulator is balanced, as it preferably is in the absence of modulating signals. During line-scannings of the color image at the camera, separate signals representative of the above-mentioned first and second parameters are derived and applied to the two balanced modulators to unbalance them, and to produce appropriately amplitude-modulated subcarrier components of constant phase difference, which are then combined to produce a resultant amplitude-and-phase modulated subcarrier signal.

During the intervals of horizontal blanking of the scanning beam of the camera, the first and second color-parameter signals become and remain substantially zero. The resultant signal from the two balanced modulators therefore also becomes substantially zero during horizontal blanking. However, in addition in accordance with a preferred embodiment of the invention, a pedestal pulse, preferably of substantially rectangular form, is generated during horizontal blanking in the "back-porch" intervals immediately following the conventional horizontal synchronizing pulses, and is utilized to unbalance at least one of the balanced modulators during these intervals. Preferably, the pedestal-pulse is added to one of the color-parameter representing signals, such as the first modulating signal mentioned above, and therefore operates to unbalance the corresponding first modulator in the same manner as does the first modulating signal, to produce bursts of oscillations having the phase of the subcarrier component generated by the first modulator. Since the output signal from the second modulator is substantially zero during the blanking intervals, the combined signal from the two modulators comprises bursts of subcarrier occurring during the pedestal pulses, which are accurately and reliably indicative of the phase of the subcarrier component produced by the first balanced modulator in response to the application thereto of color-parameter representing signals of predetermined polarity.

Although not essential, a portion of each pedestal pulse may also be added to the resultant signal from the two balanced modulators, to provide a D.-C. component for the burst, with respect to the blanking level. This eliminates or reduces the extent to which the burst oscillations invade the amplitude region usually reserved for image-representing transmissions, and therefore tends to improve the compatibility of this transmission system with regard to standard monochrome television receivers.

Conventional horizontal and vertical deflection-synchronizing signals, and signals representative of the third color-specifying parameter, may then be combined with the resultant-subcarrier signal for transmission to a receiver, wherein the bursts of phase-reference oscillations may be separated and utilized in any conventional manner to control demodulation of the first subcarrier component. Usually, a fixed, known relationship is maintained between the phases of the subcarrier components at the transmitter, so that appropriate phase-reference signals for accomplishing demodulation of the second subcarrier component may be obtained at the receiver by appropriate phase-shifting of the received phase-reference oscillations.

Other objects and features of the invention will become apparent from a consideration of the following detailed description in connection with the accompanying drawings, in which.

Although by no means limited thereto, the invention will be described with particular reference to a color television system of the compatible type, in which three signals, representative of three color-specifying parameters, are transmitted. These three general parameters may be designated as $P_1$, $P_2$ and $P_3$, represented respectively by a $P_1$ signal, a $P_2$ signal and a $P_3$ signal. Since a color may be represented by any proper set of three primaries, the choice of parameters $P_1$, $P_2$ and $P_3$ is subject to relatively wide variation in different applications, the exact nature of the particular primaries employed not being of the essence of the present invention. Among the possible sets of parameters $P_1$, $P_2$, $P_3$, for example, are the red, green and blue (R, G, B) values of an image, various triplets of linear combinations of these values, the standard I.C.I. (X, Y, Z) values of the image, or triplets of linear combinations of the latter values. Preferably, one of the parameters, such as $P_3$, is substantially representative of the brightness of the image, while the remaining parameters $P_1$ and $P_2$ specify the chroma. For example, the $P_3$ signal may comprise an approximate brightness signal $\frac{1}{3}(R+G+B)$, while the $P_1$ and $P_2$ signals may comprise $(R-P_3)$ and $(B-P_3)$ respectively. In another arrangement, $P_3$ may be the Y, or true brightness, value of the image, while $P_1=X-Y$ and $P_2=Z-Y$.

It will be apparent that the present invention is substantially independent of the exact parameters $P_1$, $P_2$, $P_3$ which are chosen, although it is preferable that $P_3$ correspond at least approximately to the brightness of the image while $P_1$ and $P_2$ represent deviations from white of the image color. $P_1$ and $P_2$ will then be zero when representing achromatic subject matter, which provides a practical convenience in operation. The $P_3$ signal may be transmitted in the form of a low-frequency video signal of standard form, while the $P_1$ and $P_2$ signals are preferably transmitted by amplitude-modulation of a corresponding pair of differently-phased subcarrier components of the same subcarrier frequency. Such a color-television system is described in detail in the copending application No. 255,776 of R. C. Moore and J. B. Chatten, entitled "Electrical System," and filed November 10, 1951, and therefore need not be described in detail herein.

Figure 1:
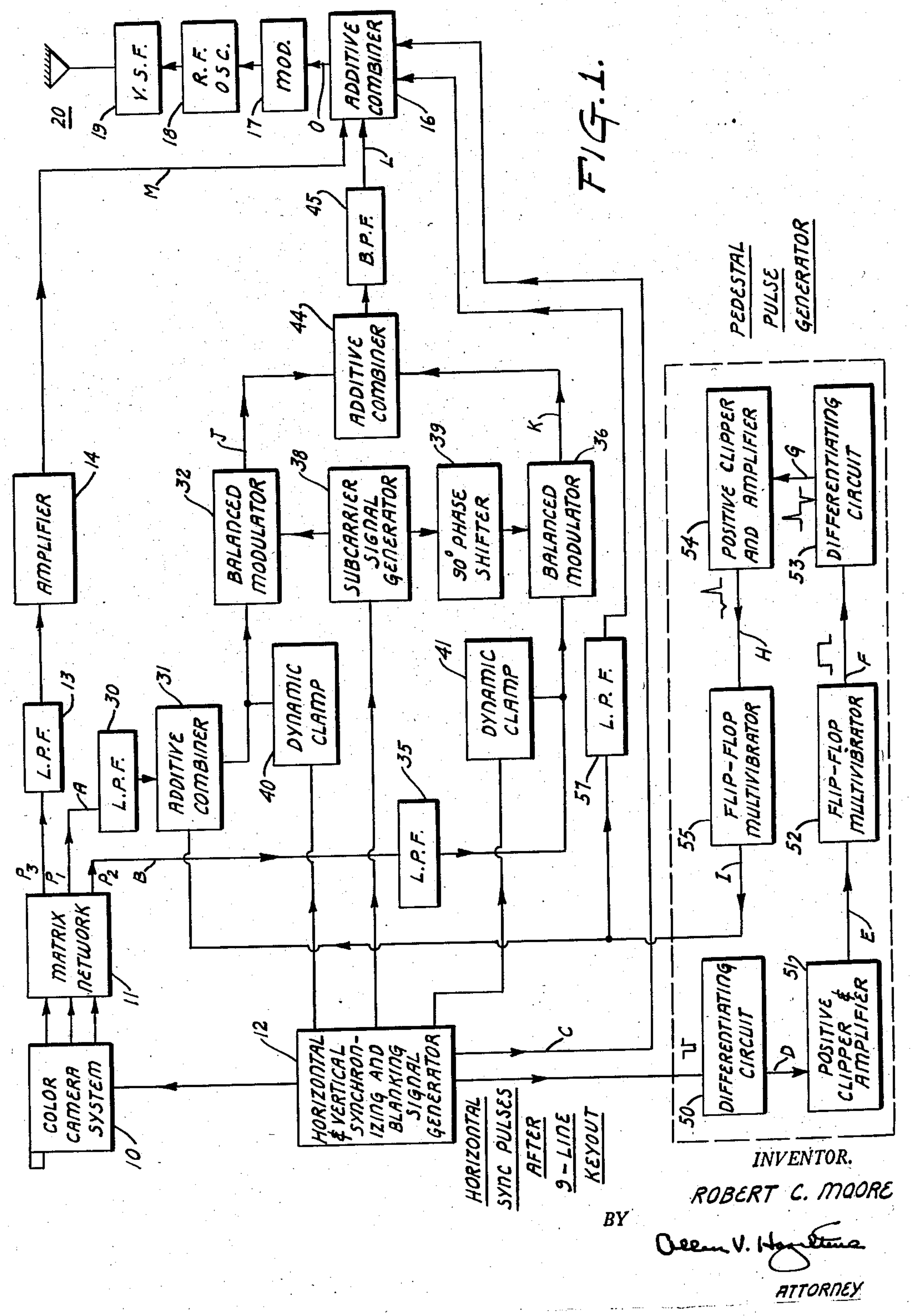
Figure 1 is a block diagram of a color television transmitter arranged in accordance with the invention.

Referring specifically now to Figure 1, $P_1$, $P_2$ and $P_3$ signals may be derived by means of color camera system 10 and matrix network 11. Camera system 10 is controlled in conventional manner by signals from horizontal and vertical synchronizing and blanking signal generator 12, so as to scan the color image in standard fashion and to derive three signals representative of the values of the color image with respect to any convenient parameters $P_1'$, $P_2'$, and $P_3'$. Since these latter parameters may, in some instances, be different from those which it is desired to transmit, the camera signals may be supplied to matrix network 11, which may contain suitable amplifiers, attenuators and cross-connections to produce, at the three output terminals thereof, the desired $P_1$, $P_2$ and $P_3$. Such matrixing networks for accomplishing, in effect, the transformation of color-coordinates from one color-specifying system to another, are well known in the art.

The $P_3$ signal from matrix network 11 may be passed through a low-pass filter 13, having a passband of 0–3 megacycles per second, for example. The band-limited $P_3$ signal is then supplied to amplifier 14 which is preferably of controllable gain so as to permit suitable adjustment of the amplitude of the $P_3$ signal in the final image-representing transmission, and thence to additive combiner 16, wherein it is combined with other signals representative of parameters $P_1$ and $P_2$ in a manner to be described fully hereinafter. From combiner 16, the $P_3$ signal is applied to modulator 17, which operates to amplitude modulate signals of carrier-wave frequency generated by R-F oscillator 18, the resultant amplitude-modulated carrier-wave signal being supplied through vestigial sideband filter 19 to radiating antenna 20 for transmission to color-television receivers. Modulator 17, oscillator 18, filter 19 and antenna 20 may be substantially identical with corresponding elements commonly employed in standard monochrome television transmitters.

The $P_1$ signal from matrix network 11 is supplied through low-pass filter 30 and additive combiner 31 to balanced modulator 32. Filter 30 serves to eliminate unnecessary high frequency components of the $P_1$ signal, representing information to which the human eye is substantially insensitive, and, when $P_1$ equals $R-Y$ or $Z-Y$ for example, may have a passband extending from 0 to 0.6 megacycle per second. The purpose of combiner 31 will become apparent hereinafter.

Similarly, the $P_2$ signal from matrix network 11 is supplied through low-pass filter 35 to balanced modulator 36, filter 35 conveniently having a passband substantially identical with that of filter 30.

Subcarrier signal generator 38 is a source of continuous-wave signals at the subcarrier frequency $f_s$, and is preferably controlled by horizontal and vertical synchronizing and blanking signal generator 12 in conventional manner so that subcarrier frequency $f_s$ is an odd integral multiple of one-half the standard horizontal line-scanning frequency. The subcarrier signal from generator 38 is supplied directly to balanced modulator 32, and to balanced modulator 36 by way of 90° phase shifter 39, resulting in a quadrature phase relationship between subcarrier signals supplied to the two modulators 32 and 36.

The detailed arrangement of a preferred embodiment of balanced modulators 32 and 36 will be described hereinafter. A significant characteristic of their preferred embodiment is that they produce substantially zero amplitude of output signal at the subcarrier frequency when the input modulating signals supplied thereto have substantially zero values, but, when the input signal to either of the modulators departs substantially from zero, signals of subcarrier frequency appear at the output terminals thereof. For departures in a predetermined direction from zero of the input signal to balanced modulator 32, the phase of the output signals from the modulator has a predetermined reference value, while for departures of input signals in the opposite direction from zero, the modulator output signals are of precisely opposite phase. A similar characteristic exists for balanced modulator 36, except that, due to the quadrature phase shift of the subcarrier signals supplied to modulator 36, the output signals of that modulator are in phase quadrature with those from modulator 32.

To insure balance of the modulators 32 and 36 during the television blanking intervals, so as to avoid the generation of subcarrier signals at such times, signal clamping devices are preferably utilized at the input terminals of the balanced modulators, to control the D.-C. level of the signals supplied thereto in such manner that the blanking level corresponds to the bias voltage for which the modulators are balanced. Since the $P_1$ and $P_2$ signals may, in general, depart from zero in either direction, ordinary clamping circuits which level at one extreme of a signal are inappropriate for the present purpose. Instead, dynamic clamps 40 and 41 are connected to the input circuits of balanced modulators 32 and 36 respectively, these clamps being rendered operative to produce leveling only during the blanking intervals. This gating of the dynamic clamps may be accomplished by suitable gating signals supplied thereto from horizontal and vertical synchronizing and blanking signal generator 12. Details of the nature and operation of dynamic clamps suitable for this purpose are well known in the art, and are described for example in U.S. Patent No. 2,299,945, of K. R. Wendt for a "Direct Current Reinserting Circuit."

The two amplitude-modulated subcarrier signal components from balanced modulators 32 and 36, which are in phase quadrature, may be combined by means of additive combiner 44 to produce a phase- and amplitude-modulated resultant subcarrier signal. This resultant subcarrier signal may then be passed through band-pass filter 45 to the aforementioned additive combiner 16 for combination with the $P_3$ signal. The passband of filter 45 may suitably extend on either side of the subcarrier signal frequency $f_s$ only by an amount necessary to accommodate those modulation components necessary to provide adequate representation of parameters $P_1$ and $P_2$, and may have a bandwidth twice that of filter 30, for example. The resultant subcarrier signal from additive combiner 16 is then supplied to antenna 20 for radiation along with the $P_3$ signal, by way of modulator 17, oscillator 18, and filter 19.

The portion of the transmitter thus far described represents a general class of color television transmitter of known form and characteristics. There will now be described the additional system elements which provide bursts of subcarrier reference signal, preferably during the "backporch" intervals of the blanking pulses, in accordance with the invention.

The general method employed for this purpose in the preferred embodiment of Figure 1, is to derive from the horizontal and vertical synchronizing and blanking signal generator 12, pedestal pulse signals occurring during the "backporch" intervals preceding each active scanning of the television image, and to combine these pulse signals with the $P_1$ signal prior to application to balanced modulator 32. The details of such an arrangement may be as follows.

A suitable connection may be made to horizontal and vertical synchronizing and blanking signal generator 12, at a point at which there exist the horizontal synchronizing pulses which immediately precede each active horizontal scanning of the television image. It will be understood that during the vertical blanking interval of a standard television signal, the image-scanning mechanism is not active due to the blanking of the beam. The duration of this interval is substantially equal to the time required for nine horizontal line-scannings of the image, and is commonly referred to as the nine-line interval. During the nine-line interval, the usual horizontal synchronizing pulses are keyed out and replaced by the conventional serrated vertical synchronizing pulses and their accompanying equalizing pulses. Accordingly, in the conventional synchronizing signal generating system exemplified by block 12 of Figure 1, there exists a series of horizontal synchronizing pulses of proper frequency and phase, which recur regularly except for a nine-line interval during which they are removed or keyed out. It is this signal, comprising the horizontal synchronizing pulses after nine-line key out, that are preferably brought out of the horizontal and vertical synchronizing and blanking signal generator 12 for use in the present arrangement. Obviously, one may alternatively bring out the ungated horizontal synchronizing pulse signals and the nine-line key-out pulses, and produce the desired keying by means of a gate circuit external to generator 12.

The horizontal synchronizing pulses, after nine-line key out, may be supplied to differentiating circuit 50, which may comprise a conventional RC circuit of relatively fast time constant, and which operates to produce one relatively narrow pulse, or pip, upon the initiation of each synchronizing pulse, and a companion pip of similar form but opposite polarity upon the occurrence of the trailing edge of the synchronizing pulses. Preferably, the synchronizing pulses may be negatively directed, so that the narrow pulses corresponding to the leading and trailing edges of the synchronizing pulses are negatively and positively directed respectively. The differentiated synchronizing pulses may then be supplied to positive clipper and amplifier 51, which comprises means for simultaneously amplifying the differentiated synchronizing pulses, for inverting the polarity thereof, and for substantially eliminating the effects of the applied positive pulses produced in response to the trailing edges of the synchronizing pulses. The positive clipping action may be provided at least in part by means of an appropriately biased diode clipper circuit of conventional form, or may be provided through inherent action of the amplifier by biasing it in such manner that severe saturation occurs for positive-going signals.

The output signal of clipper and amplifier 51 then comprises a series of relatively narrow pulses, positively directed and corresponding in time position to the occurrence of the leading edges of synchronizing pulses. These latter pulses may be used as trigger pulses to actuate a flip-flop multivibrator 52. Multivibrator 52 may be a conventional cathode-coupled multivibrator of the monostable type, which is characterized by a quiescent condition, in which it remains in the absence of trigger pulses supplied thereto, which responds to a positive trigger pulse to produce a positively-directed change in the output voltage thereof, and which remains in the latter condition for a predetermined interval characteristic of the adjustment of the circuit parameters of the multivibrator, after which it automatically returns to its original quiescent condition. The result of this operation is to produce, at the output terminals of flip-flop multivibrator 52, a substantially rectangular positive pulse having a leading edge corresponding in time to the occurrence of the trigger pulses, and a trailing edge occurring at a time determined by the adjustment of the multivibrator. Preferably the multivibrator is adjusted in such manner that the trailing edge of the positive pulse produced thereby occurs slightly later than the trailing edge of the horizontal synchronizing pulse, and therefore during the "backporch" interval of the blanking pedestal.

The rectangular pulses from multivibrator 52 may then be supplied to a differentiating circuit 53, which may be similar in form to differentiating circuit 50, and which operates to produce a positively-directed pip upon the initiation of each multivibrator pulse, and a negatively-directed pip upon the termination thereof. The differentiated output of multivibrator 52 may then be supplied to positive clipper and amplifier 54, which may be similar in form to positive clipper and amplifier 51, and which operates to produce at the output terminals thereof a positive amplified pulse occurring at a time substantially coincident with the occurrence of the trailing edge of pulses from multivibrator 52, and hence slightly after the occurrence of the trailing edges of the horizontal synchronizing pulses.

These latter pulses are then utilized to trigger another conventional flip-flop multivibrator 55, which may be similar to multivibrator 52, and which responds to the positively-directed trigger pulses applied thereto to produce, at its output terminals, substantially rectangular pulses of positive polarity having leading edges occurring slightly after the occurrence of trailing edges of the horizontal synchronizing pulses, and having trailing edges occurring at times determined by the particular adjustment of the circuit parameters of the multivibrator 55. Preferably, these parameters are so adjusted in accordance with methods well known in the art, that the trailing edges of the pulses from multivibrator 55 occur prior to the termination of the horizontal blanking intervals. The rectangular pulses produced in the output circuit of multivibrator 55 are therefore restricted to occur only during the "backporch" intervals of the horizontal blanking periods, and may, for example, be of substantially 2.3 microseconds duration. These latter pulses are designated herein as the pedestal pulses.

The pedestal pulses from flip-flop multivibrator 55 are then supplied to additive combiner 31, wherein they are combined with the $P_1$ signal and applied to the input terminals of balanced modulator 82, to unbalance the modulator during the occurrence of each pedestal pulse. The result of this unbalance is to produce, at the output terminals of balanced modulator 32, a burst of subcarrier signal occurring during the "backporch" intervals of the horizontal blanking pulses, and having a phase coherent with, and indicative of, the phase of the subcarrier component produced by balanced modulator 32 in response to a predetermined polarity of modulation by the $P_1$ signal.

Since this burst of subcarrier signal occurs during the blanking interval, it is supplied to additive combiner 44 at a time when there is no contribution thereto from balanced modulator 36. The burst of subcarrier signal then passes through bandpass filter 45 to additive combiner 16, and thence by way of modulator 17, R-F oscillator 18, vestigial sideband filter 19 and antenna 20 into space.

The transmitted subcarrier burst then comprises oscillations produced in exactly the same way and by exactly the same mechanism as are the image-representing oscillations produced by balanced modulator 32 in response to the $P_1$ signal. Accordingly, there is no possibility of even small phase errors or discrepancies between the phase of oscillations in the carrier bursts and the reference phase of subcarrier signals in balanced modulator 32.

The time of inception of the carrier burst is determined by the pulse width characteristic of multivibrator 52, while the duration of the burst is determined by the pulse width of pulses from multivibrator 55. The time of occurrence of the subcarrier burst is therefore subject to considerable variation, as is its duration. For example, in certain instances it may be desirable to cause the subcarrier burst to occur during the horizontal synchronizing pulses, which can be accomplished by appropriate adjustment of the multivibrators 52 and 55. If it is desired to cause the subcarrier burst to occur during the "front-porch" of the blanking pedestal, this may be accomplished by passing the synchronizing pulses, after nine-line key out, through a delay network having a delay less than one horizontal line period by the amount of the duration of the "front-porch," or preferably by utilizing the leading edge of the blanking pulses in the horizontal and vertical synchronizing and blanking signal generator 12 as the source of the trigger pulses for multivibrator 52.

The pedestal pulses from multivibrator 55 may also be supplied to additive combiner 16, preferably by way of a low-pass filter 57 having a bandwidth substantially the same as that of bandpass filter 45, so that the pedestal pulse form supplied to combiner 16 is substantially the same as the envelope of the subcarrier burst. The purpose of this application of pedestal pulses to the combiner 16 will become apparent hereinafter.

Figure 2:
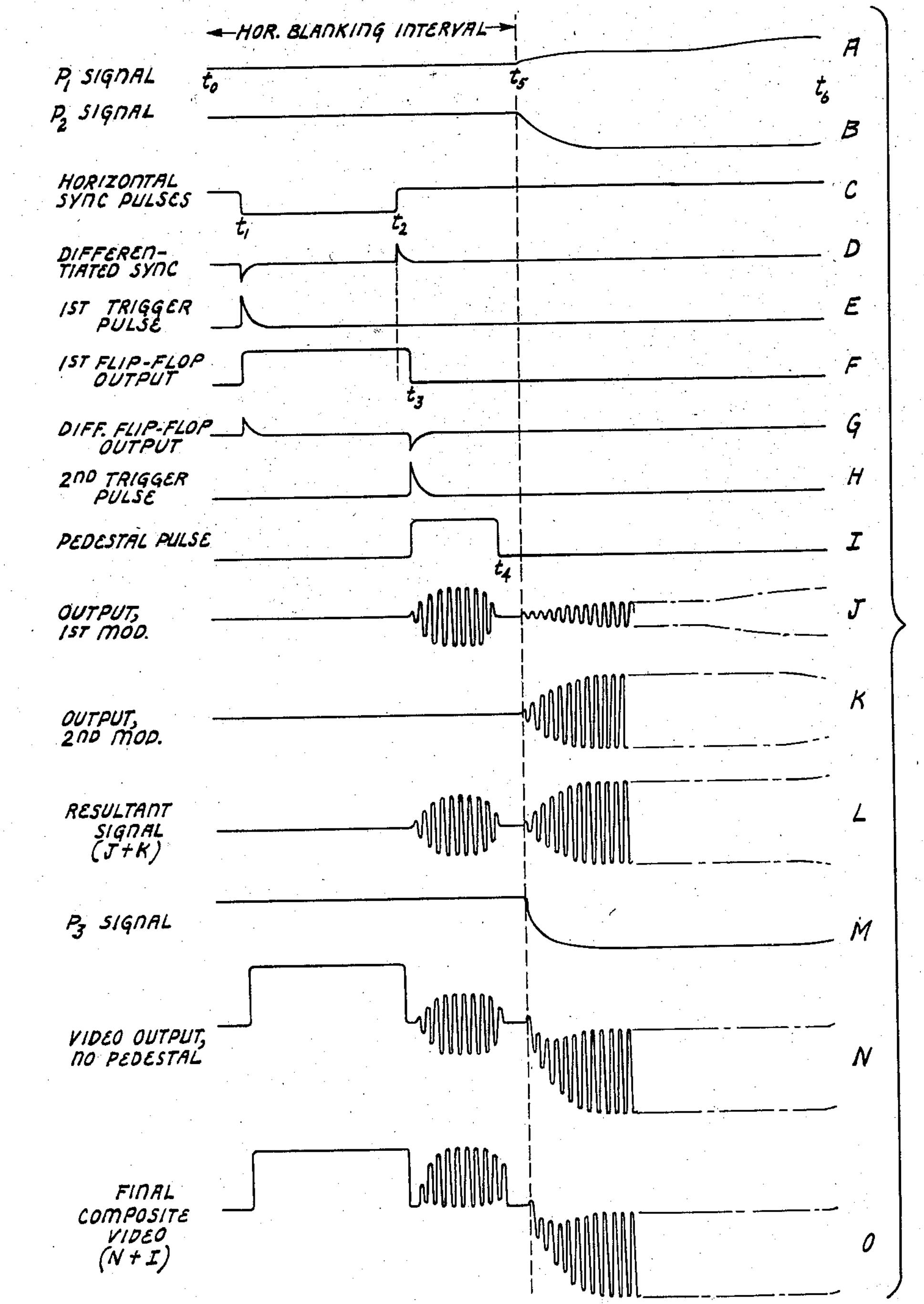
Figure 2 is a graphical representation to which reference will be made in explaining the mode of operation of the invention.

The operation of the transmitter of Figure 1 will now be considered with particular reference to the graphical representations of Figure 2. It will be understood that the representations of Figure 2 are not necessarily accurately representative of the actual relative time intervals involved, nor of the exact amplitudes of signal occurring in the system, but are intended merely to represent generally the results of the operations discussed hereinafter. In Figure 2, the ordinates in each case represent instantaneous signal amplitudes, and the absciassae represent time, the scale of time being the same for all of the graphs. The positions at which the waveforms A to O of Figure 2 appear in the transmitter, are represented by corresponding letters in Figure 1.

At A of Figure 2 there is represented the $P_1$ signal from matrix network 11, during a portion of an active horizontal line-scanning, comprising a constant reference value during blanking intervals such as that extending from time $t_0$ to time $t_5$, and comprising variations in the time interval from $t_5$ to $t_6$ which are representative of variations in the color-specifying parameter $P_1$ of the image. The exact form of the image-representing portion of the signal naturally varies depending upon the image content.

At B of Figure 2, there is represented the $P_2$ signal, which is also of a constant reference value corresponding to blanking during the interval $t_0$ to $t_5$, and possesses values in the interval $t_5$ to $t_6$ which are representative of the $P_2$ values of the color image.

A horizontal synchronizing pulse from horizontal and vertical synchronizing and blanking signal generator 12 is represented at C, and comprises a substantially rectangular, negatively-directed pulse occurring in the interval $t_1$ to $t_2$.

Differentiating circuit 50 is responsive to the horizontal synchronizing pulses to derive therefrom differentiated synchronizing pulses having the form shown at D. This latter signal comprises a negative pip coincident with the inception of the horizontal synchronizing pulse at time $t_1$, and a positive pip coincident with the termination of the synchronizing pulse, at time $t_2$.

The output signal from positive clipper and amplifier 51 is represented at E, and comprises a positively-directed narrow pip occurring at time $t_1$, contemporaneous with the inception of the horizontal synchronizing pulse.

The trigger pulses represented at E are then utilized to trigger multivibrator 52, producing pulses such as that shown at F which begin at time $t_1$ and terminate at time $t_3$, where $t_3$ is slightly later than the time $t_2$ at which the horizontal synchronizing pulse terminates.

This output pulse from the first multivibrator 52 is then differentiated to produce the waveform shown at G, comprising a positively-directed pip occurring at time $t_1$, and a negatively-directed pip occurring at time $t_3$.

After passing through positive clipper and amplifier 54, the signal has the form as shown at H, comprising a positively-directed pip occurring at time $t_3$. The latter pulse is then used as a trigger to actuate multivibrator 55, the output signal of which is the substantially rectangular, positive pulse represented at I, beginning at time $t_3$, and ending at time $t_4$, where $t_4$ precedes the termination of the blanking interval at time $t_5$.

The pedestal pulse shown at I then occurs entirely within the "backporch" interval of the horizontal blanking signal, and is absent during the nine-line key-out period.

This pedestal pulse from multivibrator 55, together with the $P_1$ signal with which it is combined by means of combiner 31, then unbalances normally-balanced modulator 32, to produce in the output of the latter modulator a signal having the general form indicated at J. The latter signal is seen to comprise a burst of oscillations at the subcarrier frequency occurring during the pedestal pulse, and an amplitude-modulated subcarrier signal following the burst pulse and representative of the $P_1$ signal.

The output of balanced modulator 36, produced in response to the $P_2$ signal shown at B, has the form represented at K, comprising an amplitude-modulated subcarrier signal occurring during the interval $t_5$ to $t_6$.

The operation of additive combiner 44 in combining the signals represented at J and K, produces the resultant signal represented at L, which comprises the burst of subcarrier oscillation during the interval from $t_3$ to $t_4$, as well as a subcarrier signal in the interval $t_5$ to $t_6$ having an amplitude and phase depending upon the amplitudes of the image-representing signals from the balanced modulators 32 and 36.

Contemporaneous values of the $P_3$ signal are represented at M, while at N there is represented the sum of the horizontal synchronizing signals, plus the subcarrier burst signals, plus the resultant subcarrier signal representative of color parameters $P_1$ and $P_2$, plus the $P_3$ signal, this sum being the signal produced at the output terminals of additive combiner 16 in response to the component signals thus far described.

At O, there is shown the output signal of additive combiner 16, when a pedestal pulse of amplitude substantially equal to one-half the horizontal synchronizing pulse amplitude is also supplied to additive combiner 16 from filter 57. The result of this addition is to raise the D.-C. level of the subcarrier burst so that the extremes of the oscillations thereof are limited to the amplitude range occupied by the horizontal synchronizing pulses, and thus do not penetrate to any extent the region below the blanking level normally reserved for image-representing signals.

From a consideration of Figures 1 and 2, it will be obvious that the output signal of balanced modulator 32 is amplitude-modulated but invariant in phase with respect to the reference oscillations from the subcarrier signal generator. However, combining this output signal with the signal from modulator 36 produces phase-modulation of the signal from modulator 32 whenever the signal from modulator 36 is amplitude-modulated. The balanced modulator 36 and combiner 44 therefore constitute means for varying the phase of the signal from modulator 32, and it is the return of the modulator 36 to a reference condition, preferably of zero output, during the selected "back-porch" intervals which makes possible the generation of phase-reference signals of invariant phase during these intervals.

Figures 3, 4:
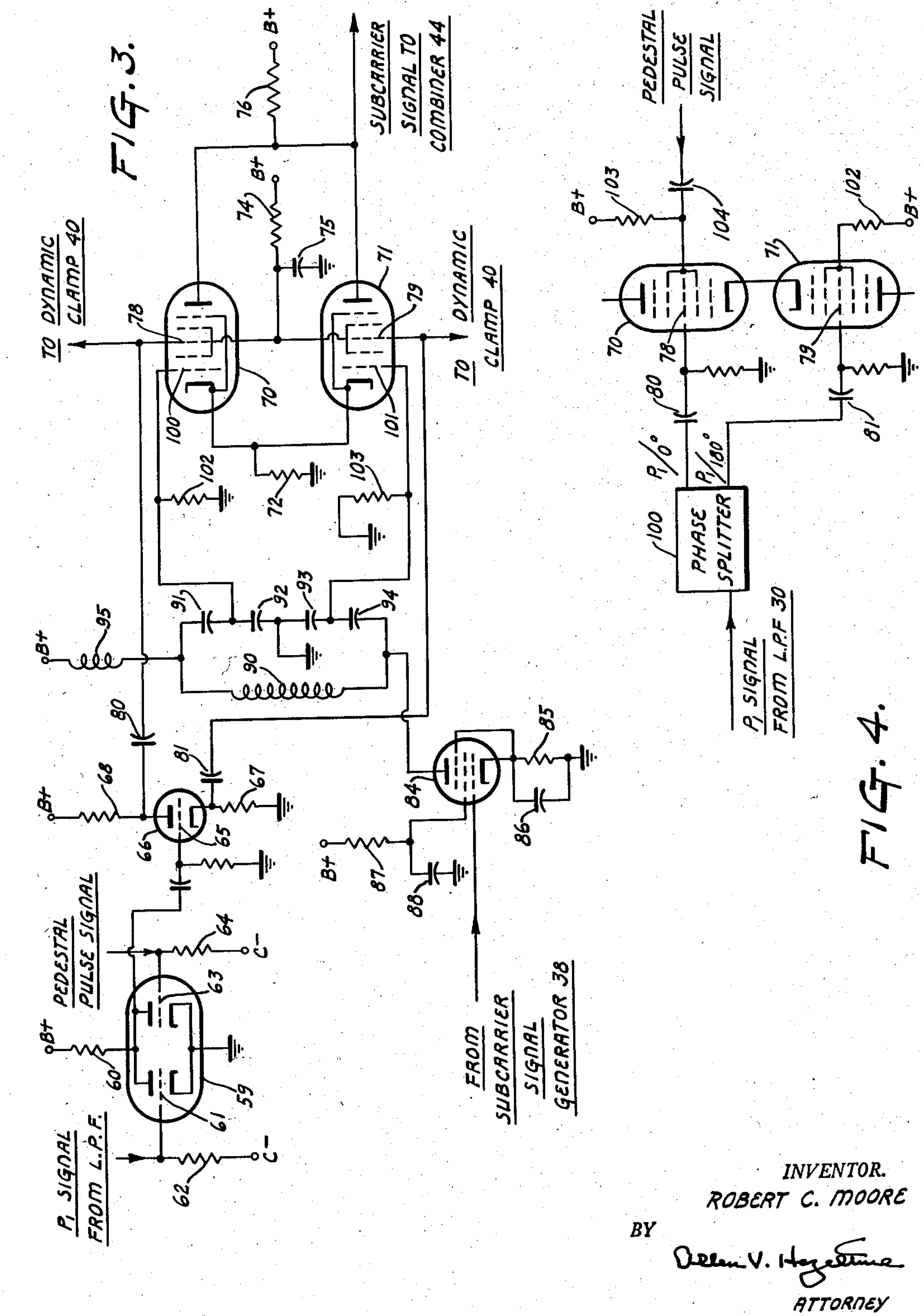
Figure 3 is a schematic diagram illustrating in detail certain features of the block diagram of Figure 1.
Figure 4 is a schematic diagram illustrating generally another embodiment of the invention.

One suitable form of the balanced modulators of Figure 1, and of the means for unbalancing one of these balanced modulators in response to the pedestal pulse, is represented in detail in Figure 3. The $P_1$ signal from low-pass filter 30 and the pedestal pulse signal from multivibrator 55 are supplied to an additive combiner which comprises, in essence, a double triode circuit having a common plate load, the grid of one triode being supplied with the $P_1$ signal and the grid of the other triode being supplied with the pedestal pulse signal. For this purpose, there may be employed a double-triode vacuum tube 59 comprising a pair of cathodes, which may both be grounded, and a pair of anodes which may be connected together and, through the common load resistor 60, to a suitable source of positive potential designated B+. The grid 61 of the first section of double-triode 59 may be supplied with the $P_1$ signal from low-pass filter 30, and with an appropriate bias supplied through grid resistor 62 from a source of negative potential designated C−. The grid 63 of the second section of triode 59 is then supplied with the pedestal pulse signal from multivibrator 55, and with an appropriate bias by way of grid resistor 64 from C−.

Since the signals at the two grids of double-triode 59 are additive in their effects upon plate current, the plate voltage of double-triode 59 is substantially proportional to the sum of the pedestal pulse signal and the $P_1$ signal. This combined signal may then be passed through an RC coupling circuit to the grid 65 of a triode 66 connected as a phase splitter. The cathode of triode 66 may be connected to ground through a cathode-load resistor 67, while the plate of this tube is connected to B+ through a plate load resistor 68. Resistors 67 and 68 preferably have equal values, so that the voltages produced thereacross in response to the same tube current will be equal at all times, but of opposite phases. The signal between the plate and cathode of tube 66 therefore comprises a pushpull version of the combined $P_1$ signal and pedestal pulse signal. This pushpull signal is applied to corresponding grids of different pentagrid vacuum tubes comprising the balanced modulator, as will be described in detail hereinafter.

The balanced modulator in the present instance may comprise a pair of pentagrid vacuum tubes 70 and 71. The suppressor grids of tubes 70 and 71 may each be connected to the cathodes thereof, and the cathodes of the two tubes, in turn, connected together and through a common cathode resistor 72 to ground. The second and fourth grids of each of tubes 70 and 71 may be supplied with appropriate screen potential from B+ by way of dropping resistor 74 and screen by-pass condenser 75. The plates of tubes 70 and 71 are connected together and, through a common plate load resistor 76, to B+. The effects upon plate voltage of varying the plate currents of the two tubes 70 and 71 are therefore effectively added together at the plates of the tubes.

The third grid 78 of tube 70 is supplied with one polarity of combined $P_1$ and pedestal pulse signal, from the plate of triode phase inverter 66, by way of coupling condenser 80, while the third grid of tube 71 is supplied with the opposite polarity of combined $P_1$ and pedestal pulse signal, from the cathode of phase inverter tube 66 by way of coupling condenser 81.

It is understood that tubes 70 and 71 and their associated circuits are so adjusted that the characteristics of the two tubes are substantially identical, particularly with regard to gain, in the absence of signal variations supplied thereto. Further, to grids 78 and 79 of tubes 70 and 71 respectively, is connected the dynamic clamp 40, which operates in effect to adjust the D.-C. level of the modulating signals applied to grids 78 and 79 in such manner that the voltages applied to these grids, during the blanking intervals of the modulating signal, are the same as those bias voltages for which the gains and plate currents of the two tubes 70 and 71 are balanced and equal.

The subcarrier signal from subcarrier signal generator 38 is converted to pushpull form for application to balanced modulator tubes 70 and 71, by means of pentode tube 84 and its associated circuits. The suppressor of pentode 84 may be connected to its cathode, and the cathode connected to ground by way of a cathode-bias resistor 85 and a subcarrier signal-frequency bypass condenser 86. The screen of tube 84 may be supplied with appropriate potential from a source of B+ by way of a dropping resistor 87 and a screen bypass condenser 88. The subcarrier signal from generator 38 may then be supplied to the first grid of pentode 84, while the plate of tube 84 is connected to a source of B+ by way of a tuned plate circuit.

The active portion of this plate circuit comprises an inductive element 90 which is parallel resonant with the series combination of condensers 91, 92, 93 and 94. The end of this tuned circuit opposite from the anode of tube 84, may be connected to the source of B+ by way of a suitable choke 95. Condensers 91 and 94 are preferably equal, and comprise the major parts of the capacitive reactance of the tuned circuit. To obtain a pair of pushpull output terminal points in the tuned circuit, the condensers 92 and 93 are employed, which are preferably equal and which are grounded at their common connection. The pair of output terminals providing pushpull signals are then located between condensers 91 and 92, and 93 and 94, respectively. Due to the D.-C. blocking characteristics of the condensers, the oppositely phased, pushpull subcarrier oscillations may be supplied directly to respective first grids 100 and 101 of pentagrid tubes 70 and 71 of the balanced modulator, these grids being also provided with appropriate grid resistors 102 and 103.

The operation of the balanced modulator arrangement of Figure 3 is as follows. In the absence of $P_1$ signals and pedestal pulse signals from combiner tube 59, subcarrier signals of single-ended form applied to the first grid of pentode 84 are converted to pushpull form in the tuned plate circuit of tube 84, and applied in opposite phases to the first grids 100 and 101 of tubes 70 and 71 of the balanced modulator. Since the gains of the pentagrid tubes 70 and 71 are equal under these conditions, the oppositely-phased subcarrier signals at grids 100 and 101 produce exactly equal and opposite effects upon the common plate current through plate load resistor 76, and no resultant subcarrier signal output is therefore produced at such times. Under these conditions, the modulator is said to be balanced.

During the periods of the blanking intervals of signals applied to grids 78 and 79 of tubes 70 and 71 respectively, the modulator remains balanced due to the aforesaid action of the dynamic clamp 40 in maintaining the reference bias on these grids during the blanking intervals at the proper value to maintain balance. However, during the image-representing portions of the $P_1$ signal, the latter signal may depart from the blanking level, producing a corresponding change in the potential applied to grid 78 of tube 70, and an opposite change in the potential of grid 79 of tube 71. The effect of this change is to produce a difference in the gains of tubes 70 and 71, and hence a difference in the amplitudes of the oppositely-phased subcarrier components produced across common plate-load resistor 76. As a result, there will be a net subcarrier signal output at such times having an amplitude substantially proportional to the deviations from the blanking level of the image-representing $P_1$ signal.

For example, when the $P_1$ signal applied to phase inverter 66 is negative, the potential at grid 78 of tube 70 will become more positive than formerly, while the potential at grid 79 of tube 71 will become more negative. The subcarrier signal component produced across plate load resistor 76 in response to variations in the potential at grid 100 will therefore exceed those produced by variations at grid 101, and the net subcarrier signal output will have a definite phase indicative of departures of the $P_1$ signal in the negative direction. When the $P_1$ signal applied to phase inverter 66 is of positive polarity, the subcarrier signal component produced by tube 71 exceeds that produced by tube 70, and the resultant subcarrier signal across resistor 76 is of exactly the opposite phase to that produced in response to negative $P_1$ signals.

During those portions of the blanking intervals in which pedestal pulse signals are supplied through combining tube 59 to phase inverter 66, a similar unbalance of the balanced modulator tube 70 and 71 is accomplished. For example, when the pedestal pulse from multivibrator 55 is positive, it will be applied in a negative sense to grid 65 of phase inverter 66, and will drive grid 78 of tube 70 more positive and grid 79 of tube 71 more negative than previously. The resultant burst of subcarrier oscillations across plate load resistor 76 is therefore coherent with, and exactly indicative of, the phase of the subcarrier signal supplied to grid 100.

The details of balanced modulator 36 (Fig. 1) may be substantially identical with those described with reference to Figure 3, and it will therefore be obvious that the output signal of balanced modulator 36 will be zero during the blanking intervals, and, more particularly, will be zero during the generation of the subcarrier burst signal by balanced modulator 32. The burst of subcarrier oscillations generated by balanced modulator 32 therefore passes through the remaining elements of the transmitting system as represented in Figure 1, without contamination or modification by any other simultaneously-occurring signals. In this way, a burst of oscillations is produced in the final resultant transmission, during the "backporch" intervals of the blanking pulse, which is accurately representative of the phase of the subcarrier signals upon which the $P_1$ signal is modulated. As has been pointed out hereinbefore, this burst of oscillation may be separated at the receiver and utilized directly, or indirectly, to control the synchronous detection of the $P_1$ signal. Due to the known quadrature relationship between the subcarrier signals supplied to balanced modulators 32 and 36, a signal for accomplishing synchronous detection of the $P_2$ signal at the receiver may suitably be derived by a quadrature phase-shifting of the separated burst oscillations.

In the foregoing description, a system has been set forth in which unbalance of one of the normally balanced modulators is accomplished by adding a pulse of known polarity to the normal image-representing signal prior to conversion of the latter signal to pushpull form. In Figure 4, there is represented generally an arrangement in which the normally-balanced modulator, such as 32 of Figure 1, is unbalanced by means of a pedestal pulse signal which is not combined with the $P_1$ signal prior to application to a control grid of a balanced modulator tube, but is instead applied directly to another electrode of that tube to accomplish unbalancing and resultant production of subcarrier burst oscillations. Thus, referring to Figure 4 in which like parts are denoted by like numerals, the $P_1$ signal from the low pass filter 30 of Figure 1 may be passed through a phase splitter 100, and the two oppositely-phased signals thus derived passed through coupling condensers 80 and 81 to grids 78 and 79 of pentagrid tubes 70 and 71, respectively. However, the second and fourth grids of each of tubes 70 and 71 are supplied with potential by different paths, in the case of tube 71 by way of dropping resistor 102, the case of tube 70 by way of dropping resistor 103. The pedestal pulses from multivibrator 55 of Figure 1, may then be applied through a suitable coupling condenser 104, to the second and fourth grids of tube 70, producing a contemporaneous change in the gain of tube 70 and a resultant unbalance of the normally-balanced modulator 32. In this instance, the mechanism by which the subcarrier burst is generated is not precisely the same as that by which the $P_1$ signal accomplishes modulation of the subcarrier signal, but the result is substantially the same. It will be obvious to one skilled in the art that a still closer approximation to the arrangement shown in Figure 3 may be accomplished by converting the pedestal pulse signal to pushpull form, and then applying it to the second and fourth grids of each of the tubes 70 and 71, thus producing a symmetrical unbalance of the normally-balanced modulator.

Although the invention has been described with reference to certain specific applications thereof, it will be apparent to one skilled in the art that it is not limited to such applications, but may be embodied in any of a variety of forms without departing from the spirit of the invention. It will, for example, be obvious that the invention is applicable not only to color television systems with reference to which it has been described hereinbefore in particular, but to many other systems of widely differing form in which it is desired to transmit a phase-modulated signal during first predetermined time-spaced intervals, and to transmit an extremely accurate and reliable phase reference signal during other time-spaced intervals interposed between said first time-spaced intervals, substantially regardless of the particular times selected for the transmission of the phase-reference signals.

Having thus described my invention, I claim:

1. In a color television system for transmitting signals representative of intelligence as to the color of images to be reproduced: sources of signals representative of the values of said color image in terms of three different color-specifying parameters during first time-spaced intervals; a first modulator supplied with a first of said parameter-representing signals and balanced at least for said supplied signal, said modulator being normally inoperative to produce an output signal, but being responsive to said first signal to produce an output signal comprising a carrier-wave signal amplitude-modulated by said first signal; a second modulator normally inoperative to produce an output signal, but responsive to a second of said parameter-representing signals to produce a second output signal comprising a carrier-wave signal amplitude-modulated by said second signal, said second modulator being balanced at least for said second parameter-representing signal, said last-named carrier-wave signal having the same frequency as, but a phase differing from that of said carrier-wave signal from said first balanced modulator; means for combining said amplitude-modulated carrier-wave signals from said first and second balanced modulators with said third parameter-representing signal; and means for momentarily unbalancing said first balanced modulator during other time-spaced intervals interspersed between said first time-spaced intervals to produce bursts of oscillations having a phase accurately representative of the phase of carrier-wave signals from said first balanced-modulator.

2. The system of claim 1, in which said last-named means comprises a device for adding a pulse signal to said first parameter-representing signal prior to application to said first balanced modulator.

3. In combination: means for producing first and second carrier waves of the same frequency and of different phases; means for producing first and second modulating signals respectively representative of different intelligence; first and second modulators, each having a carrier wave input terminal, a modulating signal input terminal and an output terminal, each of said modulators being balanced at least for signals applied to said modulating signal input terminal; means for supplying said first carrier wave to said carrier wave input terminal of said first modulator and for supplying said second carrier wave to said carrier wave input terminal of said second modulator; means for supplying, during predetermined time-spaced intervals only, said first modulating signal to said modulating signal input terminal of said first modulator and for supplying, during said intervals only, said second modulating signal to said modulating signal input terminal of said second modulator; means for supplying, during different time-spaced intervals only, an independently produced modulating signal to said modulating signal input terminal of at least one of said modulators; and means for additively combining the signals produced by said modulators at said output terminals.

4. The combination of claim 3 further characterized in that said independently produced modulating signal has the form of substantially rectangular pulses, at least one of said pulses occurring during each of said different intervals.

5. In combination: means for producing first and second carrier waves of the same frequency and of different phases; means for producing first and second modulating signals respectively representative of different intelligence; first and second modulators, each having a carrier wave input terminal, a modulating signal input terminal and an output terminal, each of said modulators being balanced at least for signals applied to said modulating signal input terminal; means for supplying said first carrier wave to said carrier wave input terminal of said first modulator and for supplying said second carrier wave to said carrier wave input terminal of said second modulator; means for supplying, during predetermined time-spaced intervals only, said first modulating signal to the modulating signal input terminal of said first modulator and for supplying, during said intervals only, said second modulating signal to said modulating signal input terminal of said second modulator; means for supplying to said modulating signal input terminal of said first modulator a pulse-form modulating signal during the intervals which intervene between said predetermined intervals; means for establishing, during said intervening intervals, said modulating signal input terminal of said second modulator in its zero modulating signal condition; and means for additively combining the signals produced by said modulator at said output terminals during any of said intervals.

References Cited in the file of this patent

UNITED STATES PATENTS

| | | |
|---|---|---|
| 2,333,969 | Alexanderson | Nov. 9, 1943 |
| 2,492,926 | Valensi | Dec. 27, 1949 |
| 2,513,159 | Fredendall | June 27, 1950 |
| 2,558,489 | Kalfaian | June 26, 1951 |
| 2,580,903 | Evans | Jan. 1, 1952 |
| 2,776,334 | Goldberg | Jan. 1, 1957 |